(12) United States Patent
Tsui et al.

(10) Patent No.: US 9,485,124 B2
(45) Date of Patent: Nov. 1, 2016

(54) METHOD AND APPARATUS FOR MULTIPLE BIT ENCODING

(75) Inventors: Gallen Ka Leung Tsui, Brampton (CA); Philip Y. W. Tsui, Brampton (CA)

(73) Assignees: Gallen Ka Leung Tsui, Brampton (CA); Philip Y. W. Tsui, Brampton (CA)

( * ) Notice: Subject to any disclaimer, the term of this patent is extended or adjusted under 35 U.S.C. 154(b) by 1980 days.

(21) Appl. No.: 12/267,396

(22) Filed: Nov. 7, 2008

(65) Prior Publication Data

US 2010/0046670 A1 Feb. 25, 2010

Related U.S. Application Data

(60) Provisional application No. 61/090,823, filed on Aug. 21, 2008.

(51) Int. Cl.
*H04L 27/00* (2006.01)
*H04L 25/49* (2006.01)
*H04L 27/04* (2006.01)

(52) U.S. Cl.
CPC ........... *H04L 25/4906* (2013.01); *H04L 27/04* (2013.01)

(58) Field of Classification Search
CPC . G08C 17/02; G08C 2201/62; H04B 5/0012
USPC .............. 375/295, 309; 340/5.26, 5.21
See application file for complete search history.

(56) References Cited

U.S. PATENT DOCUMENTS

| | | | |
|---|---|---|---|
| 4,995,053 A * | 2/1991 | Simpson et al. | 375/130 |
| 5,798,711 A | 8/1998 | Issa et al. | |
| 5,872,519 A | 2/1999 | Issa et al. | |
| 5,914,667 A | 6/1999 | Issa et al. | |
| 5,949,349 A * | 9/1999 | Farris et al. | 340/5.26 |
| 5,952,933 A | 9/1999 | Issa et al. | |
| 6,191,701 B1 * | 2/2001 | Bruwer | 340/5.22 |
| 7,154,938 B2 | 12/2006 | Cumeralto et al. | |

FOREIGN PATENT DOCUMENTS

EP 1209840 5/2002
EP 1209841 5/2002

OTHER PUBLICATIONS

Canadian Search Report and Written Opinion dated Jan. 16, 2009.

\* cited by examiner

*Primary Examiner* — David S Huang
(74) *Attorney, Agent, or Firm* — Troutman Sanders LLP

(57) ABSTRACT

Methods and apparatus for encoding data for wireless transmission are disclosed in which a data message may be encoded into a transmission code as a first coding format and a second coding format. The first coding format characterized by a first bit representation and the second coding format characterized by a second bit representation different from the first bit representation. The transmission code may be transmitted having the first and second coding formats.

32 Claims, 7 Drawing Sheets

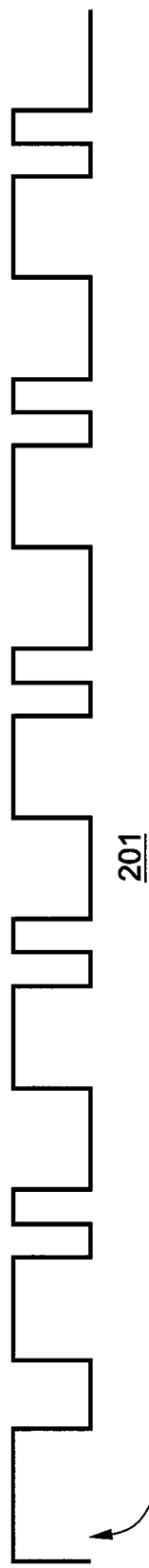
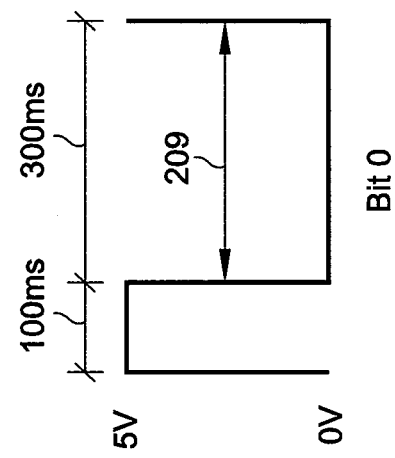
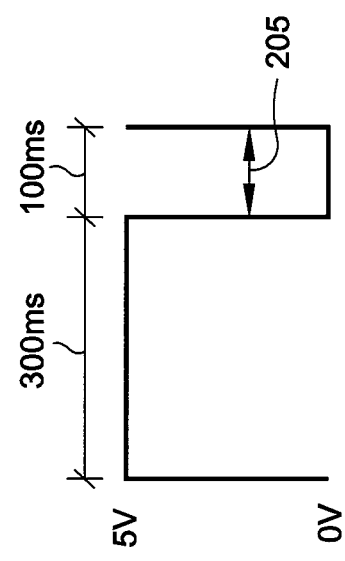
Fig. 2A
Fig. 2B
Fig. 2C

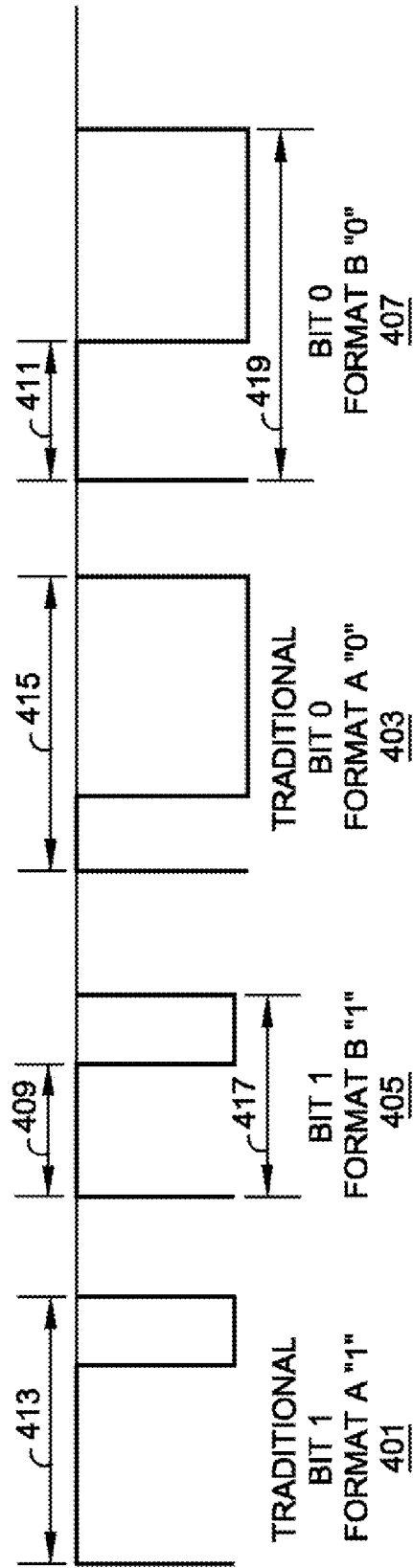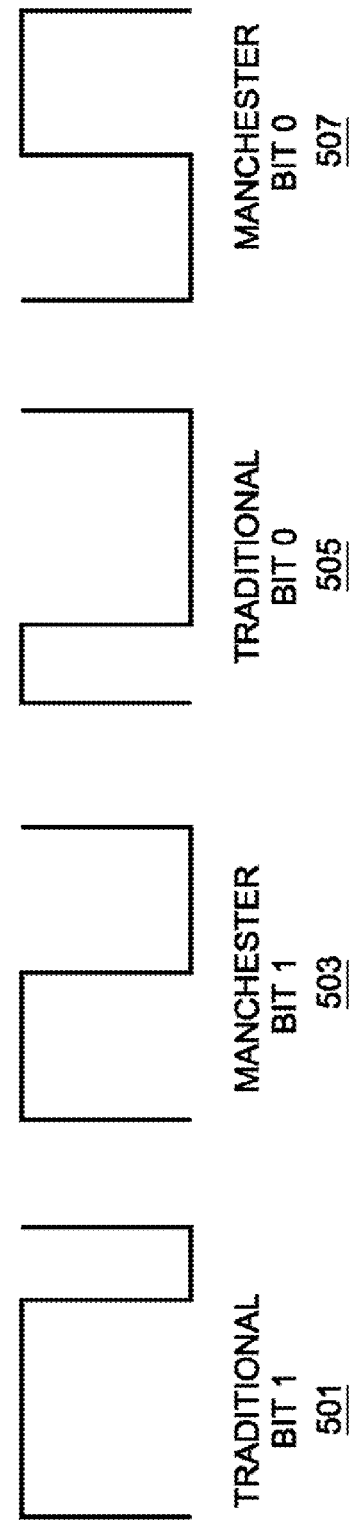

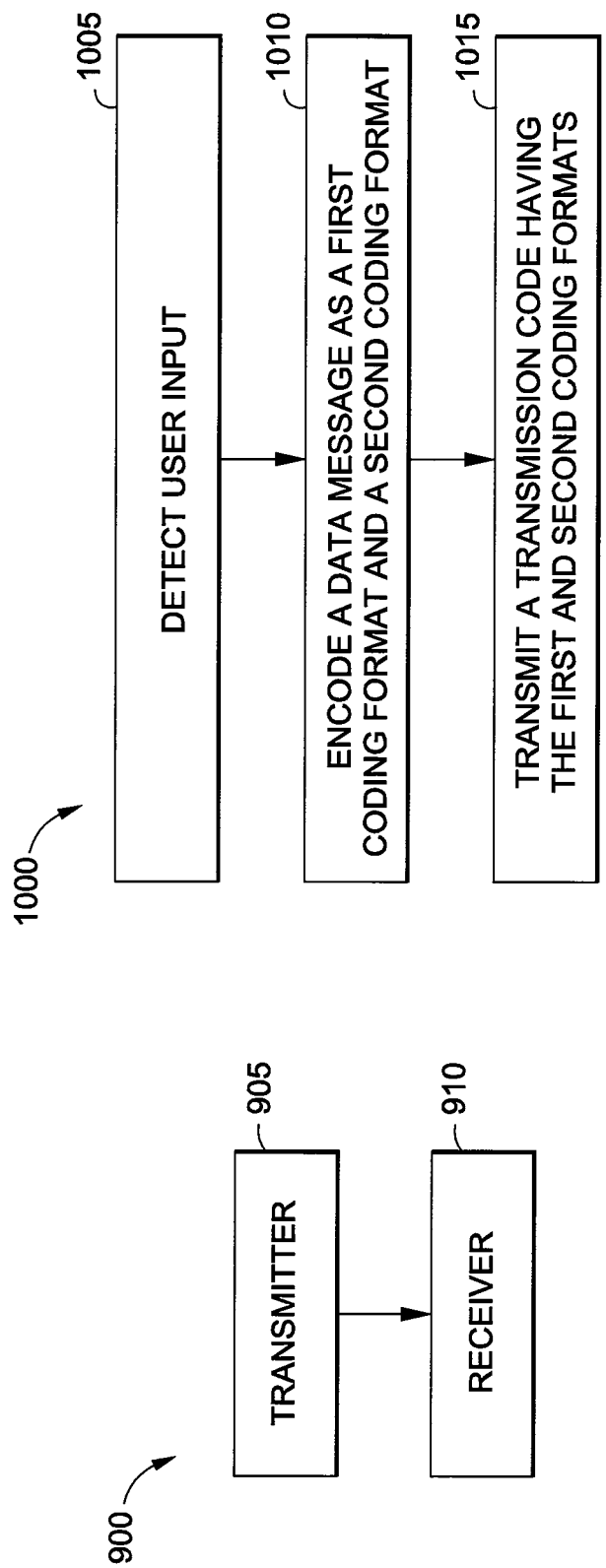

METHOD AND APPARATUS FOR MULTIPLE BIT ENCODING

CROSS REFERENCE TO RELATED APPLICATION

This application claims the benefit of U.S. Provisional Application No. 61/090,823, filed Aug. 21, 2008.

FIELD OF THE INVENTION

The invention relates generally to wireless transmission methods and more particularly to an apparatus and method for wireless transmission using multiple bit encoding.

BACKGROUND

On-Off Keying (OOK) is a popular wireless transmission modulation method which is widely used in remote controls for car alarm systems, wireless home alarm systems, remote controls for garage door openers, and wireless home automation devices. In contrast to other wireless transmission techniques, such as Frequency Shift Keying, Frequency Hopping Technology, and Spread Spectrum Technology, which are used in many wireless applications (e.g., Wi-Fi™, Bluetooth™, cordless telephones, etc.), OOK is considerably less complicated and hence less expensive. OOK may be used in wireless communications where the amount of data transmission is limited, such as remote control for garage door openers. For wireless communications requiring limited data, such as garage door openers, complicated wireless data transmissions or protocols is not necessary. Thus, in order to provide a low cost solution, these applications employ a signal encoded with the identification number of the remote. Receiving the signal carrying the identification number will cause the garage door opener to actuate the opener.

While OOK is known for use in less complicated wireless transmission applications, there still exists a need to provide secure transmission of data without significantly impacting the cost of such systems.

Encryption for wireless signals has been used for years. One of the most popular encryption methods for wireless transmission is rolling code technology (RCT). RCT is implemented into both transmitters and receivers, such that a current data transmission is different from each previous data transmission. This is typically accomplished by having a specific rolling code algorithm built-in to both the transmitter and receiver. Based on the signal received from the transmitter and the specific rolling code algorithm, the receiver calculates the next code to expect. This is designed to minimize the danger of capturing a previously-transmitted code and re-transmitting it at a later time for unauthorized access.

While RCT has been used for many years for wireless transmission applications, additional encryption is always desired. It is desired that with additional encryption, cost will not be increased significantly. Therefore, there is a need for an improved wireless communication protocol with enhanced degree of security over present technology without significantly impacting the overall cost of the transmission system.

BRIEF SUMMARY OF THE INVENTION

Disclosed and claimed herein are a system and method for encoding data for wireless transmission. In one embodiment, the method includes encoding a data message into a transmission code as a first coding format and a second coding format, wherein the first coding format is characterized by a first bit representation and the second coding format is characterized by a second bit representation different from the first bit representation. The method includes transmitting the transmission code having the first and second coding formats.

Other aspects, features, and techniques of the invention will be apparent to one skilled in the relevant art in view of the following detailed description of the invention.

BRIEF DESCRIPTION OF THE DRAWINGS

FIGS. 2A-2C are graphical representations of data bit patterns according to one or more embodiments of the invention;

FIG. 4 is a graphical representation of multiple bit patterns according to one or more embodiments of the invention;

FIG. 5 is a graphical representation of binary and Manchester bit patterns according to one or more embodiments of the invention;

FIG. 9 is a simplified block diagram of a system according to one embodiment of the invention; and FIG. 10 is a graphical representation of a process according to one embodiment of the invention.

DETAILED DESCRIPTION OF THE EXEMPLARY EMBODIMENTS

One aspect of the present invention relates to wireless transmission employing multiple bit patterns or codes. In one embodiment of the invention, data may be encoded as, and decoded from, multiple bit patterns. Multiple bit patterns may relate to bit or code patterns comprising a plurality of representations for each of "1" and "0" values of a bit stream. According to another embodiment, multiple bit patterns may include binary and Manchester bit representations in the same pattern. Further, bit patterns may employ one or more fixed, random and/or rolling bit placement.

According to one embodiment of the invention, multiple bit patterns may be generated by a microprocessor-based circuit. Multiple bit patterns may be configured to provide increased security without affecting response of the operation. In one embodiment, multiple bit patterns may be employed for existing code patterns wherein the number of data bits may be kept the same. As such, the same number of bit combinations may be provided while increasing the number of bit patterns. According to another embodiment, additional coding combinations may be provided by a rolling code algorithm by employing multiple bit patterns.

Figure 1:
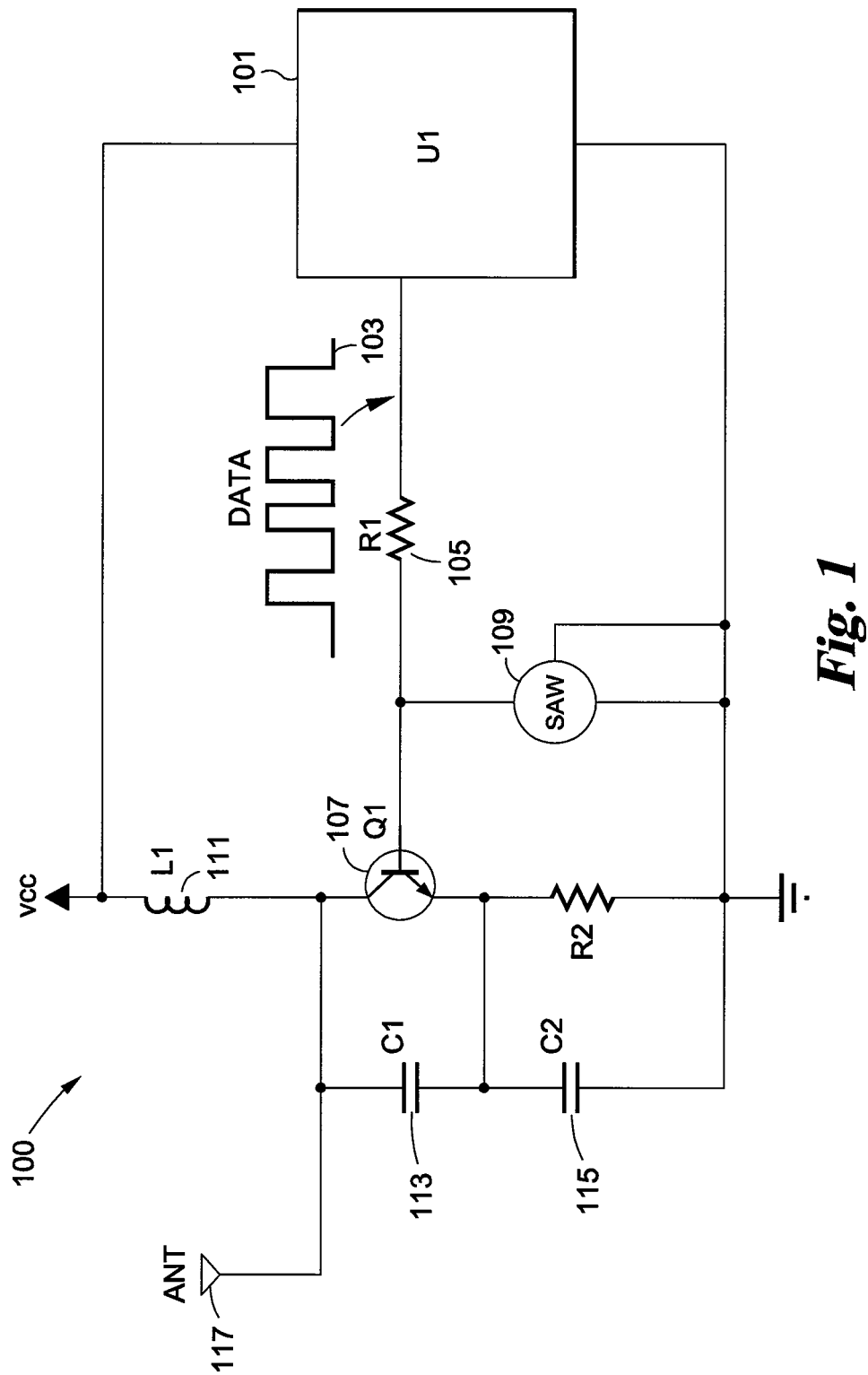
FIG. 1 is a circuit diagram of a transmitter circuitry according to one embodiment of the invention.

Referring now to the drawings, FIG. 1 is a schematic of a transmitter according to one embodiment of the invention.

Transmitter 100 may be configured to generate one or more signals comprising multiple patterns. As shown in FIG. 1, transmitter 100 includes microprocessor 101 configured to generate the data message 103 comprising a series of high-low pulses. Data message 103 may be generated by the microprocessor 101 to drive the biasing resistor 105. Transistor 107, SAW resonator 109, inductor 111, feedback capacitors 113 and 115 form an oscillator circuit to transmit one or more wireless signals.

Microprocessor 101 may control transmission by data message 103. When data message 103 is a high level, or "1" (e.g., VCC voltage), the data message will drive transistor 107 through the biasing resistor 105 such that transistor 107 can oscillate with a frequency determined by SAW resonator 109 and radiate out through the antenna 117. If data message 103 is a low value, or 0 (e.g., 0 V), there will be no biasing current for transistor 107 such that transistor 107 stops oscillating and no radio signal will be radiated at the antenna 117. The oscillating circuit may be modulated by the data message 103 output by microprocessor 101. In that fashion, transmitter 100 may provide On-Off Keying (OOK) modulation. It may also be appreciated that the transmitter 100 may be employed for wireless controls including remote garage door openers, wireless door bell transmitters, wireless car alarms, wireless home controls and wireless control in general. One advantage of OOK modulation may be a relatively low cost in comparison to other wireless transmission methods. It may also be appreciated that transmitter 100 may be configured for other types of wireless modulation.

Referring now to FIGS. 2A-2C, bit patterns are shown according to one or more embodiments of the invention. As shown in FIG. 2A, bit pattern 201 represents OOK data which may be generated by transmitter 100 of FIG. 1. Bit pattern 201 comprises 10 bits of data and a sync bit 202. The total bit length of bit pattern 201 is 11 bits. In one embodiment, sync bit 202 of bit pattern 201 may be used as a wake up bit for a receiver (not shown). The bits following sync bit 202 represent data of bit pattern 201 for transmission. Each bit of bit pattern 201 is represented by a rising edge to falling edge (or vice versa) of a square wave. Bit pattern 201 comprises two different bit representations, "1" and "0".

Referring now to FIG. 2B, bit 203 corresponds to data bit "1", or logical high, and is represented by a square wave having a duration of 300 milliseconds (ms) at a high voltage level, and duration 205 of 100 ms at the low voltage level. In FIGS. 2A-2C, a high voltage level corresponds to 5 volts DC and a low voltage level corresponds to 0 volts DC. However, it should be appreciated that other voltage values would be similarly consistent with the principles of the invention.

As shown in FIG. 2C, bit 207 is a data bit "0", or logical low, which is represented by a square wave with 100 milliseconds (ms) in high voltage level and duration 209 of 300 ms at the low voltage level. It may be appreciated that durations of bit 203 and bit 207 are exemplary, and that other durations may be similarly employed. Each data bit (i.e., bits 203 and 207) has its unique bit pattern representation. Therefore, for binary code, there are only 2 data bit patterns, either the bit pattern for "1" or the bit pattern for "0".

It should generally be understood that data generated by a microprocessor (e.g., microprocessor 101) can be modulated by the transmitter circuitry with OOK modulation and transmitted to a receiver (not shown). The receiver may receive and decode the transmitted data to perform one or more operations.

Figure 3:
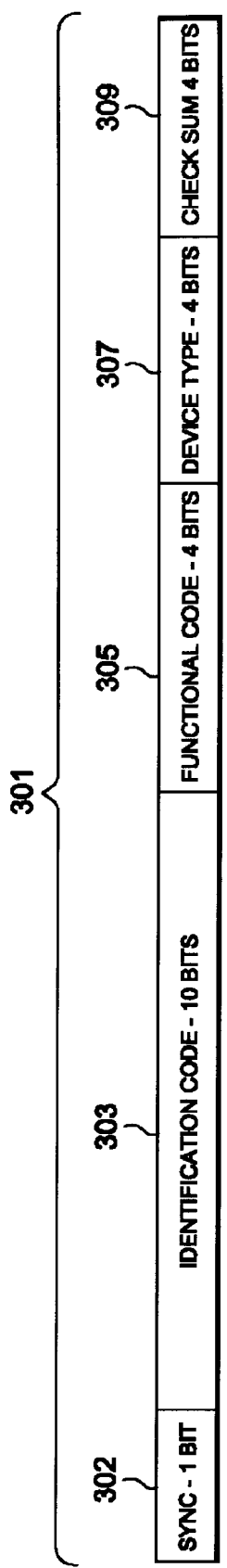
FIG. 3 is a graphical representation of message information according to one embodiment of the invention.

Referring now to FIG. 3, a data message 301 is shown, which in one embodiment may be generated by the transmitter 100 of FIG. 1. As shown in FIG. 3, the data message 301 (e.g., data message 103) comprises a plurality of code bits. Data message 301 comprises sync bit 302 (e.g., sync bit 202), which may be found at the beginning of the data message. Followed by sync bit 302 is the actual data message which includes device identification code 303, a unique code from one unit to another in order for the receiver to identify the transmitting device, and functional code 305, which represents the actual function such as "On" or "Off". Data message 301 may include device type 307 to indicate what type of device is sending this signal, such as a full functional master controller or a motion sensor. Finally, the data message 301 may also include check sum 309 to ensure the received information is correct. Checksum 309 may be calculated in a specific way based on the selected data bits and a specific formula. If the checksum calculated by the receiver does not match checksum 309, the receiver will not respond to a signal provided by data message 301.

Referring now to FIG. 4, graphical representations are shown of multiple one-bit patterns for representing one data value. Typically, data messages generated are in a binary format, such that each bit can be represented by either "1" or "0". Therefore, using only a binary format, if the identification code consists of 10 bits, the maximum combination for an identification code is 2^10, resulting in 1024 combinations. In a similar fashion, representing codes by 4 bits would give 16 different functions. To that end, the higher the number of bits, the more the information can be represented.

Traditional encoding methods represent data values by only one-bit patterns. In contrast, the present disclosure relates to a plurality of distinct one-bit patterns to represent the same data value. As shown in FIG. 4, for example, multiple one-bit patterns can represent a single data value. By way of example, a first bit pattern having a first format (Format A) which is similar to a traditional binary bit pattern may be represented as a value 1 represented by Format A "1" 401 and a value 0 represented by Format A "0" 403. According to another embodiment, a second one-bit pattern having a Format B may include a value 1 represented by Format B "1" 405 and a value 0 represented by Format B "0" 407, wherein Format B is different from Format A. Moreover, Format B may be different from Format A in several ways. Unlike Format A, the high duration for both bit patterns in Format B, 409 and 411 may be the same. In an exemplary embodiment, high duration 409 and 411 may correspond to 200 ms. In another embodiment, total duration for Format A, shown as 413 and 415 may be fixed. In an exemplary embodiment, total duration 413 and 415 may correspond to 400 ms per bit pattern. In contrast, the total duration for Format B is different between a logical "1" and "0". For example, bit pattern "1" in Format B has overall duration 417 of 300 ms, where bit pattern "0" has an overall duration 419 of 500 ms. It may be appreciated that other durations may be similarly used.

According to another embodiment, by having two different bit pattern formats, it is possible to achieve more bit message combinations. By way of example, with only one bit pattern format (one bit pattern for "1" and another bit pattern for "0"), a 10-bit message can have up to 1024 combinations. However, with two bit pattern formats (two bit patterns for "1" and two bit patterns for "0"), as disclosed herein, a 10-bit message can generate about 1 million possible code combinations. Further, three bit pattern formats (three bit patterns for "1" and three bit patterns for "0"), a 10-bit message can generate above 60 million possible combinations. Therefore, by increasing the number of bit pattern formats, the coding combinations can be increased significantly.

Response time to a received data message (e.g., data message 301), is directly proportional to the length of the data message. The longer the data message is (or the higher the number of bits), the slower the response will be from the receiver. Therefore, according to another embodiment, it may be desirable to not increase the number of bits while increasing the coding combinations. With the multiple bit patterns approach of the present disclosure, the number of bits can remain the same. The only change may be the content of the data message while the length of the code remains the same.

As shown in FIG. 4, the four possible bit pattern durations are not the same. In other words, the different bit patterns can be completely different from each other, without limitation on the duration, or the overall patterns.

Referring now to FIG. 5, graphical representations are shown of multiple one-bit patterns according to another embodiment of the invention. In a preferred embodiment, a traditional OOK encoding method may be used for a first format (Format A) and a Manchester encoding method may be used for a second format (Format B) to further illustrate the application of multiple bit pattern technology.

As shown in FIG. 5, bit patterns 501 and 503 represent data value "1". Bit pattern 501 corresponds to a traditional bit pattern for data value "1", as explained above. Bit pattern 503 corresponds to a bit pattern for data value "1", classified as a Manchester Code. However, it may be appreciated that other code formats may be used for the second code type. Bit pattern 505 may correspond to a traditional bit pattern for data value "0", while bit pattern 507 corresponds to a Manchester Code representing data value "0".

Figure 6:
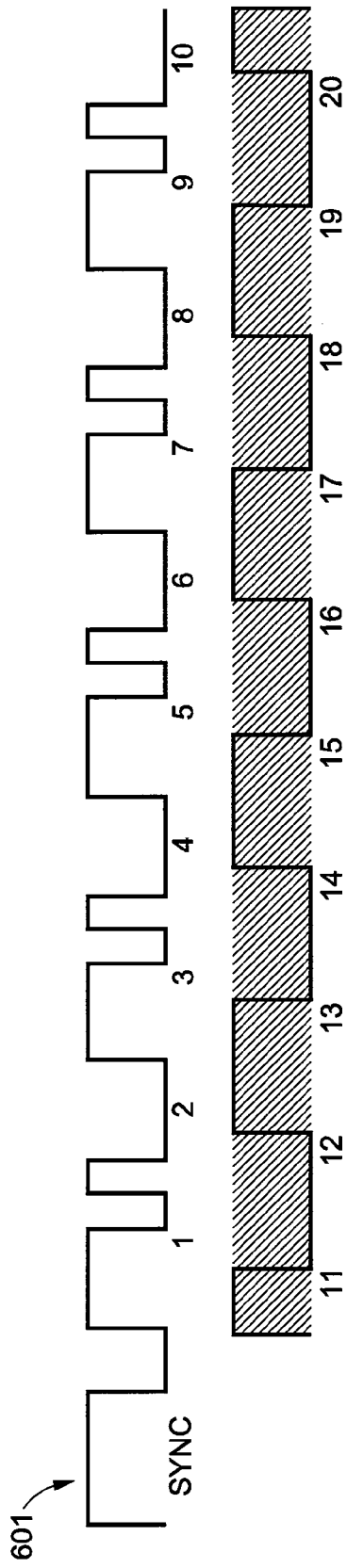
FIG. 6 is a graphical representation of fixed bit placement bit patterns according to one or more embodiments of the invention.

Referring now to FIG. 6, integration of different bit patterns into a data message is shown, according to one or more embodiments. One solution may be to include fixed bit patterns. As used herein, fixed bit patterns may relate to bit patterns employing a particular coding format for a particular length of bits. For example, as shown in FIG. 6, bit pattern 601 comprises a data message with 20 bits. The first 10 bits are all with traditional bit patterns. The last 10 bits of data message 601 is represented by the Manchester Code bit patterns (as shown by the shading pattern). The content of the data message 601 may now be more complex due to the fact that there are four possible bit patterns instead of only the two bit patterns of a traditional data message. If the number of bit patterns were to increase for data message 601, the complexity of the code would correspondingly increase. In this example, the first half of data message 601 includes traditional bit patterns, and the second half of the data message 601 includes Manchester code patterns. Aside from splitting the data message 601 in half based on the two different bit patterns, there are similarly many different combinations within data message 601, such as all odd bits using the traditional bit patterns and all even bits using the Manchester code pattern. According to one embodiment, a receiver will be able to respond to data message 601 as long as the bits are assigned in a pre-arranged manner.

Figure 7:
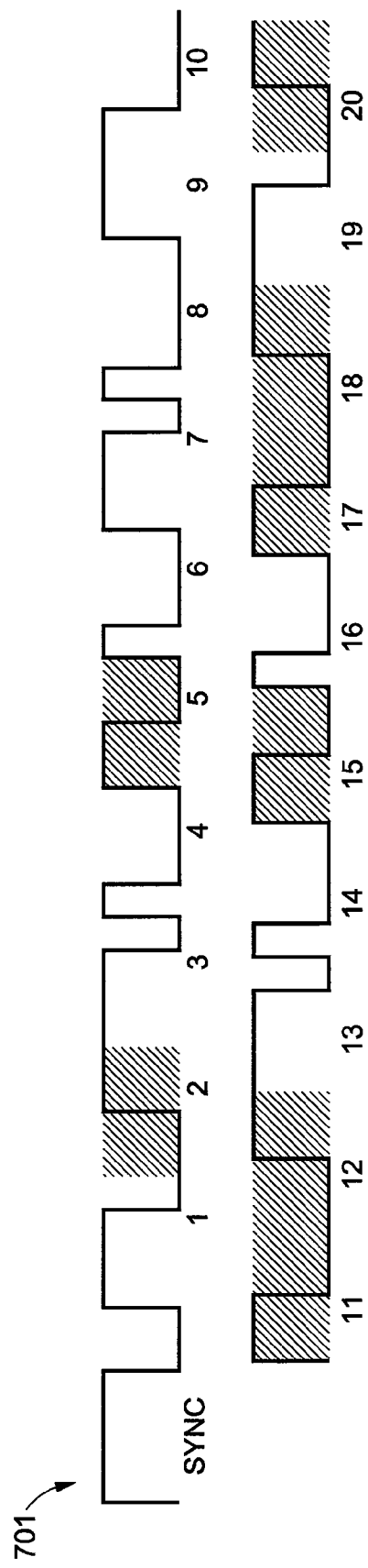
FIG. 7 is a graphical representation of fixed bit placement bit patterns according to one or more embodiments of the invention.

According to another embodiment, different bit patterns may be integrated into a data message by placing the different bit patterns into the message on a random basis. Further, the ratio between the two bit patterns may be fixed within the data message. Referring now to FIG. 7, data message 701 corresponds to a 20-bit data message in which traditional bit patterns and Manchester bit patterns are mixed in the data message. As shown in FIG. 7, shaded bits represent Manchester Bit Patterns, and non-shaded bits represent traditional bit patterns in a ratio of 12:8 (traditional versus Manchester) of data message 701. According to one embodiment, the only condition data message 701 has to fulfill is this fixed ratio (e.g., 12:8) between the two bit patterns. A microprocessor of a receiver may be configured to determine which bits are represented by traditional bit patterns and which bits are represented by Manchester bit patterns in order to decode data message 701. Representation of such bits may vary between each signal transmission. However, as long as the ratio between the two bit patterns is correct, the receiver can properly respond to the data message.

Figure 8A:
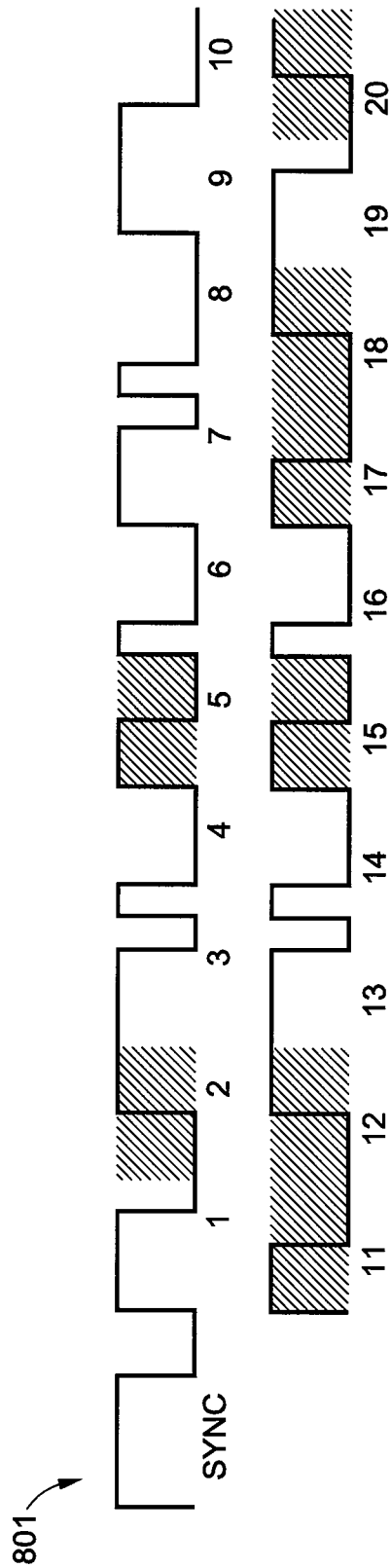
FIGS. 8A-8B are graphical representations of rolling bit placement bit patterns according to one or more embodiments of the invention.
Figure 8B:
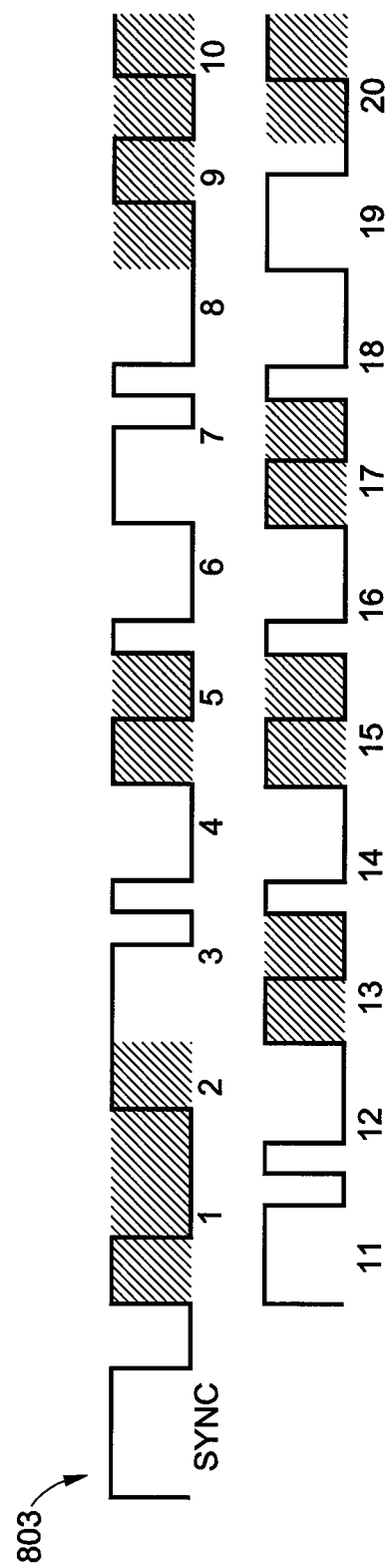

Referring now to FIGS. 8A-8B, graphical representations are shown of rolling bit placement data messages. In one embodiment, rolling bit placement may be a more complex way to integrate different bits into a data message by selectively placing different bit patterns at desired bits. Further, the bit placement may be different for every signal transmission, similar to rolling code algorithm in wireless transmission.

As shown in FIG. 8A, data message 801 represents a 20-bit pattern having traditional and Manchester bit patterns. Data message 801 may relate to a first code, wherein bits 2, 5, 11, 12, 15, 17, 18, 20 use Manchester bit patterns. Referring now to FIG. 8B, data message 803 may relate to a second code. In one embodiment, after transmitting the first code of data message 801, the second code, data message 803, will be transmitted as a second transmission. For the second signal transmission, bits 1, 2, 5, 9, 10, 13, 15, 17, 20 of data message 803 use Manchester bit patterns. The first and second codes can represent the same data message, however, the bit pattern assignment is different. If two consecutive first codes are received, the receiver will not respond to the second "first code", according to one embodiment of the invention. A receiver could be configured to detect a different bit pattern representation. For example, bit patterns could appear to change randomly; however, each code may be calculated based on a specific formula for a receiver to detect which bits should be in traditional bit patterns and which bits should be in Manchester bit patterns. In one embodiment, if the received bit patterns do not match with the one calculated by the receiver, the receiver will not respond, even if the data message is otherwise correct.

According to another embodiment, rolling code technology may be employed to integrate multiple bit patterns in order to generate additional coding combinations. As a result, a more complex data message may be generated. In another embodiment, multiple bit patterns can be integrated to the original rolling code data message by one or more of random bit placement (with a fixed ratio between the two bit patterns) or rolling bit placement. Rolling bit placement can result in two rolling code algorithms—one algorithm to calculate rolling code values and a second algorithm to calculate bit pattern placement, with bits coded in a traditional bit pattern and bits coded with a Manchester bit pattern. To that end, the complexity level of the data message may be increased.

Referring now to FIG. 9, a simplified block diagram is shown of a system for encoding data for wireless transmission according to one embodiment of the invention. As shown in FIG. 9, system 900 includes transmitter 905 and receiver 910. Transmitter 905 may be configured for encoding a data message into a transmission code as a first coding format and a second coding format. Operation of transmitter 905 may be initiated by a user activating a user input (not shown) of transmitter 905. Receiver 910 may be configured to decode the transmission code and actuate the equipment based on the data message. As shown in FIG. 9, transmitter 905 may communicate with receiver 910 via wireless communication link. It may be appreciated that system 900 may be employed for one or more of wired and wireless communications, one-way and two way communications.

Referring now to FIG. 10, a process is shown for encoding data for wireless transmission according to one embodiment of the invention. Process 1000 may be performed by a transmitter (e.g., transmitter 905) according to one embodiment. As shown in FIG. 10, process 1000 may be initiated when a user input is detected at block 1005. At block 1010, the transmitter encodes a data message as a first coding format and a second coding format. The first coding format may be characterized by a first bit representation and second coding format is characterized by a second bit representation different from the first bit representation. It may also be appreciated that encoding may be based on one or more code formats. At block 1015, the transmission code is transmitted having the first and second coding formats. Further, the bit placement may be different for every signal transmission, similar to a rolling code algorithm in wireless transmission.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for encoding data for transmission, the method comprising the acts of:
   encoding a data message into a transmission code using a first coding format and a second coding format, wherein the first coding format is characterized by a first bit representation and the second coding format is characterized by a second bit representation different from the first bit representation, and wherein a bit placement bit pattern of the transmission code includes a random bit placement bit pattern having a fixed ratio between bits of the data message encoded according to the first coding format and the second coding format, wherein the bit placement bit pattern of the transmission code assigns the first coding format to a different set of bit assignment locations for consecutive transmission codes where the consecutive transmission codes represent the same data message with randomly changing bit pattern assignment for each transmission; and
   transmitting the transmission code including the first and second coding formats.

2. The method of claim 1, wherein encoding the data message comprises:
   encoding a first portion of the data message in the first coding format; and
   encoding a remaining portion of the data message in the second coding format.

3. The method of claim 1, wherein the encoding the data message comprises calculating a rolling bit placement bit pattern using a second algorithm.

4. The method of claim 1, wherein a bit representation of the first and second bit representations corresponds to at least one of binary code, Manchester code, and On-Off Keying (OOK).

5. The method of claim 1, wherein the bit placement bit pattern comprises a calculated selection of at least one of a plurality of fixed bit placement bit patterns and random bit placement bit patterns, wherein the random bit placement bit patterns include fixed ratios between bits of the data message encoded according to the first coding format and the second coding format.

6. The method of claim 1, wherein the transmission code comprises at least one of a sync bit and a check sum.

7. The method of claim 6, wherein equipment is selectively activated based on detection of at least one of the sync bit and the check sum.

8. The method of claim 1, wherein the bit placement bit pattern of the transmission code comprises the random bit placement bit pattern and the fixed ratio is 12:8.

9. The method of claim 1, further comprising generating the data message based on a received user input.

10. The method of claim 1 further comprising:
    receiving the transmission code, and
    decoding the data message.

11. The method of claim 1, wherein the transmission code is transmitted wirelessly.

12. An equipment actuation system comprising: a transmitter configured to
    encode a data message into a transmission code using a first coding format and a second coding format, wherein the first coding format is characterized by a first bit representation and the second coding format is characterized by a second bit representation different from the first bit representation, and wherein a bit placement bit pattern of the transmission code includes a random bit placement bit pattern having a fixed ratio between bits of the data message encoded according to the first coding format and the second coding format, wherein the bit placement bit pattern of the transmission code assigns the first coding format to a different set of bit assignment locations for consecutive transmission codes where the consecutive transmission codes represent the same data message with randomly changing bit pattern assignment for each transmission; and
    transmit the transmission code including the first and second coding formats.

13. The system of claim 12, wherein the transmitter is configured to encode the data message by:
    encoding a first portion of the data message in the first coding format; and
    encoding a remaining portion of the data message in the second coding format.

14. The system of claim 12, wherein the transmitter is configured to encode the data message, at least in part, by calculating rolling code values for the data message using a first algorithm.

15. The system of claim 12, wherein a bit representation of the first and second bit representations corresponds to at least one of binary code, Manchester code, and On-Off Keying (OOK).

16. The system of claim 12, wherein the transmission code comprises at least one of a sync bit and check sum.

17. The system of claim 16, wherein the receiver is configured to actuate the equipment based on a detection of at least one of the sync bit and the check sum.

18. The system of claim 12, wherein the bit placement bit pattern comprises a calculated selection of at least one of a plurality of fixed bit placement bit patterns and random bit placement bit patterns, wherein the random bit placement bit patterns include fixed ratios between bits of the data message encoded according to the first coding format and the second coding format.

19. The system of claim 12, wherein the bit placement bit pattern of the transmission code comprises the random bit placement bit pattern and the fixed ratio is 12:8.

20. The system of claim 12, wherein the transmitter is configured to generate the data message based on a received user input.

21. The system of claim 12, wherein the transmitter is further configured to:
calculate rolling code values using a first algorithm; and
calculate the rolling bit placement bit pattern using a second algorithm.

22. The system of claim 12 further comprising a receiver configured to decode the transmission code and selectively actuate equipment based on the data message.

23. The system of claim 12, wherein the transmission code is transmitted wirelessly.

24. The system of claim 12, wherein the transmitter encodes the data message into the transmission code as the first coding format and the second coding format, wherein the first coding format is characterized by a first code representation and the second coding format is characterized by a second code representation different from the first code representation.

25. The system of claim 24, wherein a code representation of the first and second code representations corresponds to at least one of binary code, Manchester code, and On-Off Keying (OOK).

26. A method for encrypting an activation code for an actuation system, the method comprising the acts of:
encrypting a data message into a transmission code using a first coding format and a second coding format, wherein the first coding format is characterized by a first code representation and the second code format is characterized by a second code representation different from the first code representation, and wherein a bit placement bit pattern of the transmission code includes a random bit placement bit pattern having a fixed ratio between bits of the data message encoded according to the first coding format and the second coding format, wherein the bit placement bit pattern of the transmission code assigns the first coding format to a different set of bit assignment locations for consecutive transmission codes where the consecutive transmission codes represent the same data message with randomly changing bit pattern assignment for each transmission; and
transmitting the transmission code including the first and second coding formats.

27. The method of claim 26, wherein encrypting the data message comprises encoding a first portion of the data message in the first coding format and encoding a remaining portion of the data message in the second coding format.

28. The method of claim 26, wherein a code representation of the first and second code representations corresponds to at least one of binary code, Manchester code, and On-Off Keying (OOK).

29. The method of claim 26, wherein the bit placement bit pattern comprises a calculated selection of at least one of a plurality of fixed bit placement bit patterns and random bit placement bit patterns, wherein the random bit placement bit patterns include fixed ratios between bits of the data message encoded according to the first coding format and the second coding format.

30. The method of claim 26, wherein encrypting the data message comprises calculating rolling code values for the data message using a first algorithm and calculating a rolling bit placement bit pattern using a second algorithm.

31. The method of claim 26 further comprising:
receiving the transmission code, and
decoding the data message.

32. The method of claim 26, wherein the transmission code is transmitted wirelessly.

* * * * *